(12) United States Patent
Horner

(10) Patent No.: US 8,376,818 B2
(45) Date of Patent: Feb. 19, 2013

(54) THRUST RECOVERY, OR OTHER VALVE, CONTAINING TWO INDEPENDENTLY ACTUATED DOORS AND CONTROL SYSTEM

(75) Inventor: Darrell Horner, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 430 days.

(21) Appl. No.: 12/362,366

(22) Filed: Jan. 29, 2009

(65) Prior Publication Data

US 2010/0190428 A1  Jul. 29, 2010

(51) Int. Cl.
*B64D 13/02* (2006.01)
(52) U.S. Cl. ........................ 454/71; 244/129.5
(58) Field of Classification Search ............ 454/71, 454/75, 76; 244/1 N, 129.1, 129.5
See application file for complete search history.

(56) References Cited

U.S. PATENT DOCUMENTS

| | | | |
|---|---|---|---|
| 3,376,803 A | | 4/1968 | Emmons |
| 3,387,804 A | * | 6/1968 | Rhines ..................... 244/129.5 |
| 3,426,984 A | * | 2/1969 | Emmons .................. 244/129.5 |
| 3,436,039 A | | 4/1969 | Seger et al. |
| 3,486,721 A | * | 12/1969 | Myczinski ............... 244/129.5 |
| 3,544,045 A | * | 12/1970 | Butscher ...................... 454/73 |
| 3,740,006 A | * | 6/1973 | Maher ...................... 244/129.5 |
| 6,116,541 A | * | 9/2000 | Chuang et al. .............. 244/1 N |
| 6,273,136 B1 | * | 8/2001 | Steinert et al. ............ 244/118.5 |
| 6,682,413 B1 | * | 1/2004 | Hoffman et al. ............. 454/156 |
| 7,185,853 B2 | * | 3/2007 | Kelnhofer et al. ......... 244/129.5 |
| 7,198,062 B2 | * | 4/2007 | Hoffman et al. ............... 454/71 |
| 2002/0193063 A1 | | 12/2002 | Scheerer et al. |
| 2006/0019594 A1 | * | 1/2006 | Horner et al. ................ 454/74 |
| 2008/0233854 A1 | | 9/2008 | Horner et al. |
| 2010/0001127 A1 | | 1/2010 | Petrac |
| 2010/0216385 A1 | | 8/2010 | Heuer |

FOREIGN PATENT DOCUMENTS

GB      1128936 A    10/1968

* cited by examiner

*Primary Examiner* — Eric Keasel
(74) *Attorney, Agent, or Firm* — Shimokaji & Assoc., PC

(57) ABSTRACT

A thrust recovery valve has two flaps, with each flap controlled independently via its own rotary actuator. Embodiments of the present invention also provide a cabin pressure control system that includes one or two thrust recovery valves and the controls architecture to efficiently operate the valves. On each thrust recovery valve, only one door can be operated during flight, making less effective area change per unit time (relative to the operating both doors at the same time), allowing higher resolution of valve control. Further, the valve doors can be made such that the primary door that is operated in flight is smaller than the other door (mostly only operated on the ground). Because the doors of the thrust recovery valve can be operated independently, the forward door of each valve can be rotated such that the door creates a ram air "scoop" to ingress air to prevent negative pressure from building up beyond a specified limit.

7 Claims, 5 Drawing Sheets

THRUST RECOVERY, OR OTHER VALVE, CONTAINING TWO INDEPENDENTLY ACTUATED DOORS AND CONTROL SYSTEM

BACKGROUND OF THE INVENTION

The present invention relates to a thrust recovery valve and more particularly, to a thrust recovery valve having two flaps, with each flap controlled independently via its own actuator. The present invention further relates to a cabin pressure control system that includes one or two thrust recovery valves.

Aircraft which utilize conventional thrust recovery valves, or other skin mounted cabin air exhaust valves, face several challenges in their design and performance.

The first challenge is that there are times when a high resolution of control is required during flight at high differential pressures across the fuselage. The high resolution is required because the control of cabin pressure requires very small valve aperture changes for each periodic valve adjustment.

The second challenge is that the aerodynamic torque on the valve can be very great when the valve is opened because the frontal area of the valve is in the slipstream of air passing by the valve.

Another challenge is how to optimize ram air ingress of air from outside the airplane during negative pressure relief operation. Traditionally, the thrust recovery valve can only open to a 90-degree position with both doors linked (or on a single door valve, the single door opens to 90-degrees) and an external suction is created after the first (or only) door position such that a lot of air exits the fuselage into this lower pressure region—overcoming the benefit of the rammed in air prior to the forward door. Therefore, on some airplanes, a dedicated ram air scoop is used to provide for ventilation airflow during negative pressure relief conditions. This ram air scoop adds system weight and complexity and cost.

An additional challenge is that thrust recovery valves are expensive and heavy, so having more than two thrust recovery valves can be wasteful. But, in the event of a mechanical failure of the valve, having two or one thrust recovery valves can limit the ability to dispatch the airplane with one thrust recovery valve "blocked" closed, since air distribution and positive and negative pressure relief functions are compromised (higher probability that after the failure of the remaining valve a hazardous event could occur).

Finally, thrust recovery valves may be operated via rotary actuators, with linkages to both doors, such that the structure to hold the actuators often drives the weight of the thrust recovery valves higher than desired.

It is possible that each door of the valve might need to be operated by independent controls, sometimes working together to accomplish the same goal (ground opening for ventilation) and sometimes each having different functions (regulating differential pressure in flight on one control while providing various ventilation functions with the other).

U.S. Pat. No. 6,273,136 describes a thrust recovery valve design utilizing one "common" "drive mechanism" for both valve (stages) doors, using complex linkages and door arrangements to accomplish some of the above stated advantages. Further, the prior art, has a one drive mechanism controller to drive the common drive mechanism that actuates the multiple stages of the valve.

As can be seen, there is a need for a thrust recovery valve that may provide failsafe operation and reduce weight, complexity and cost while providing cabin air pressure regulation within the aircraft.

SUMMARY OF THE INVENTION

In one aspect of the present invention, a thrust recovery valve comprises a first door; a second door; a first actuator controlling the first door; and a second actuator controlling a second door.

In another aspect of the present invention, a thrust recovery valve comprises a first door; a second door; a first actuator controlling the first door; and a second actuator controlling the second door, wherein the first door is a different size from the second door, and the first actuator is independent from the second actuator.

In a further aspect of the present invention, a cabin pressure control system comprises a first thrust recovery outflow valve; and a first outflow valve controller, wherein the first thrust recovery outflow valve includes a forward door and an aft door, the forward door operated by a first actuator and the aft door operated, independently of the forward door, by a second actuator.

These and other features, aspects and advantages of the present invention will become better understood with reference to the following drawings, description and claims.

DETAILED DESCRIPTION OF THE INVENTION

Figure 1:
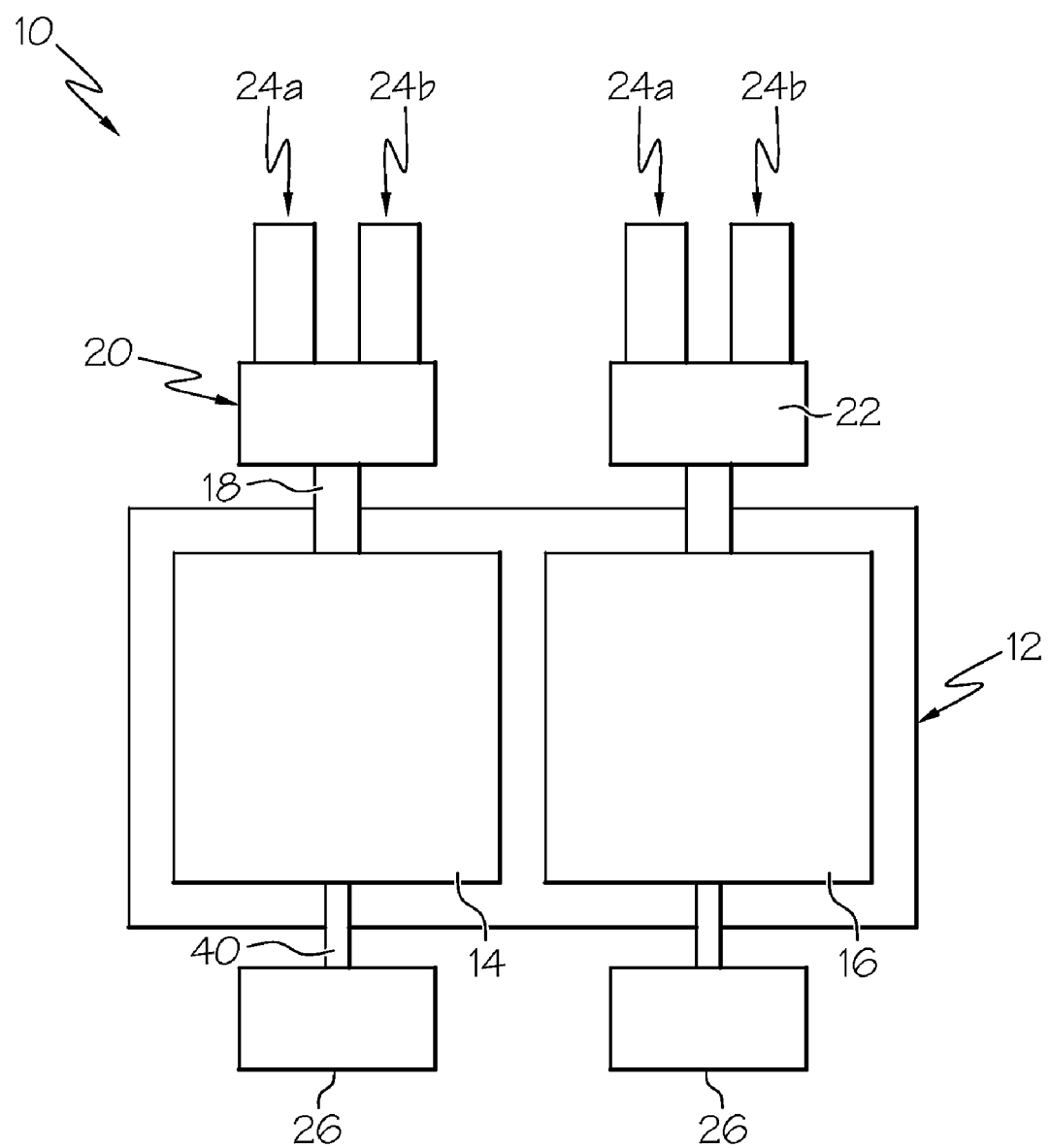
FIG. 1 is a schematic drawing showing a thrust recovery valve according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention provides a thrust recovery valve that has two flaps, with each flap controlled independently via its own rotary actuator. Embodiments of the present invention also provide a cabin pressure control system that includes one or two thrust recovery valves and the controls architecture to efficiently operate the valves.

Embodiments of the present invention may allow that on each thrust recovery valve, only one door can be operated during flight, making less effective area change per unit time (relative to the operating both doors at the same time), allowing higher resolution of valve control. Further, the valve doors can be made such that the primary door that is operated in flight is smaller than the other door (mostly only operated on the ground). Thus, the smaller door may require less operating torque than the larger door, requiring smaller motors and less overall aircraft power. This may result is reduced controller weight (less thermal heat load to dissipate) and wire weight (smaller diameter wires). Further, the smaller primary door can be rotated always inward to the airplane, thus eliminating the aerodynamic torque caused from the exterior air speed on the frontal area of the door projected outward.

Because the doors of the thrust recovery valve can be operated independently, the forward door of each valve can be rotated such that the door creates a ram air "scoop" to ingress air to prevent negative pressure from building up beyond a specified limit. Normal rotation of the forward door would be to 90° (relative to the full closed position). This limitation is due to valve linkages and because rotation further than 90-degrees would have no beneficial effect. One embodiment of the present invention may allow the forward door to be rotated up to (for example) 135-degrees, while the aft door is rotated to the closed (0-degrees) position. This configuration may allow ram air to go into the fuselage through the forward door, but may allow very little air sucked back out of the fuselage due to the closed aft door.

With the independently operated thrust recovery valve doors, according to embodiments of the present invention, if one door were to be mechanically stuck (due to either motor, actuator, linkage, or door bearing failures), the other door may be unaffected. Thus, with a single valve system, the cabin pressure control system could still be operated with one-half of the valve's outflow capability. Likewise, with a dual outflow valve system and one valve door is stuck, the system could be operated with three-fourths of the total outflow capability. This may enable the airplane to dispatch with such a failure and not compromise the control functions such as avionics ventilation, positive pressure relief, and normal cabin pressure control. Thus, airplanes that might otherwise have more than one or two outflow valves are not required to add additional valves to the system to obtain the same functionality—saving cost and weight.

According to embodiments of the present invention, the actuators can be smaller because they drive less overall torque per actuator. This could result in the actuator mounting structure to be smaller relative to the actuator that has to drive both doors at the same time. Also, because of the simplicity of only driving one door (less complex linkage), simple linear actuators can be used to drive each door. This may allow a very simple "rod-end" joint to mount the frame side of the actuator. This may result in the actuator and valve frame becoming even smaller.

Referring to FIG. 1, there is shown a thrust recovery valve 10 with a single frame 12, containing a forward door 14 and an aft door 16. Each door 14, 16 may be mounted to the frame 12 such that travel of each door 14, 16 may be independent of the other door, except, for example, when the doors 14, 16 are designed to overlap when closed. In this event, the doors 14, 16 would not be able to travel through each other in an attempt to continue rotation. Otherwise, independence between the doors 14, 16 may be assured because there are no linkages connecting the forward door 14 to the aft door 16 either directly or via a gear box output shaft 18. Each of the doors 14, 16 may be controlled by an independent gearbox, a forward gearbox 20 and an aft gearbox 22. Each independent forward 20 or aft gearbox 22 may be controlled by one or more motors 24.

The motors 24 for each gearbox 20, 22 can be considered primary motor 24a or a backup motor 24b, or two primary and one manual (three motor gearbox, not shown), or a single primary motor (single motor gear box, described below). Each forward door 14 and aft door 16 can be driven by different types of gearboxes, such that a forward door 14 can be driven by a single motor gearbox and the aft door 16 can be driven by a different number of motors.

In addition, if required, a position sensor 26 for each door may be given. The position sensors 26 may output a signal representing the rotary position of the outflow valve 10. The position sensors 26 may be independent of each other (forward and aft). Also, for redundancy, the position sensors 26 could output more than two redundant signals, one used for the primary output and another used for backup output. If required, the position sensors 26 may output two signals whereby failure of the first signal on the sensor 26 would not also cause failure of the second signal. The position sensors 26 could be mounted on the gear box 20, 22, or on a door hinge 40, depending on the benefits of each design.

Figure 2:
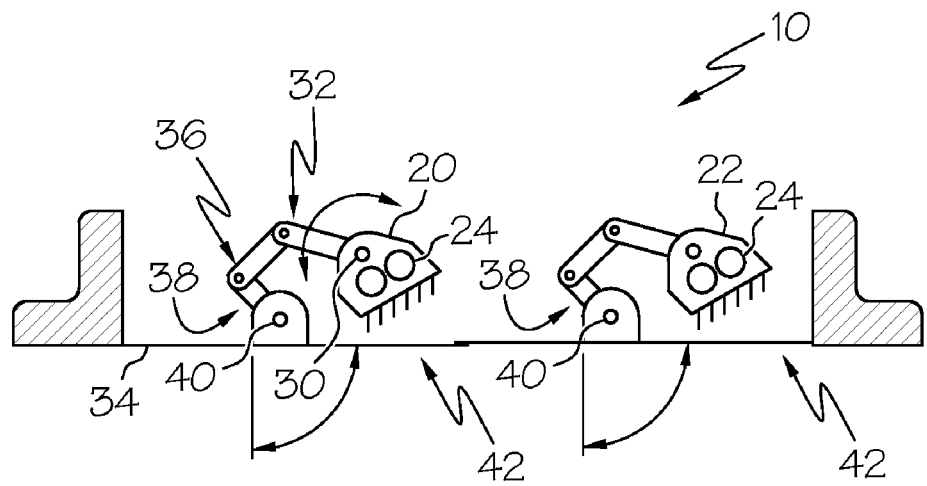
FIG. 2 is a schematic drawing showing the gearbox to valve orientation of the thrust recovery valve of FIG. 1.

For a rotary type actuator, FIG. 2 shows the gearbox 20, 22 to valve 10 orientation. Note that each gear box 20, 22 may contain motors 24, an output shaft 30, and a crank arm 32 that may be fixed to the output shaft 30, such that when the output shaft 30 rotates, the crank arm 32 may swing in a rotational arc.

The crank arm 32 may be connected to a door 34 via a link 36. The link 36 may be pinned to the crank arm 32 and to a door swing arm 38 such that there may be a pivot of rotation between these joints at each pin. The door swing arm 38 may be attached to the door 34 such that the swing arm 38 and the door 34 may be fixed, rotationally, to each other.

Thus, rotation of the actuator output shaft 30 may cause rotation of the crank arm 32. Resulting crank arm 32 rotation may cause tension or compression on the link 36, which may cause rotational torque on the door swing arm 38. Rotational torque on the door swing arm 38 may cause the door 34 to rotate on its hinge 40. Thus, rotation of each door 34 may be allowed through the noted door stroke.

As may be understood by the art, when considering FIG. 2, it can be shown that the crank arm 32, link 36, and door swing arm 38 can be designed to provide different mechanical advantages between the forward door 14 and aft door 16.

Further, FIG. 2 shows that the doors 14, 16 can be operated independently of each other through a full range of stroke angles, provided that both doors 14, 16 do not try to pass through each other at the full closed position.

FIG. 2 shows that each rotary gearbox 20, 22 may be fixed in position relative to the valve frame 12. Because of the locations of each gearbox 20, 22, FIG. 2 shows that the gearboxes 20, 22 can be placed aft to the hinge 40 of each door 14, 16 they are operating, allowing an aft side 42 of the door 14, 16 to rotate away from the inside of the airplane. Further, as shown in FIG. 3, the positioning of the gearboxes 20, 22 in FIG. 2 may allow both doors 14, 16 to be opened beyond the 90-degree position.

Figure 3:
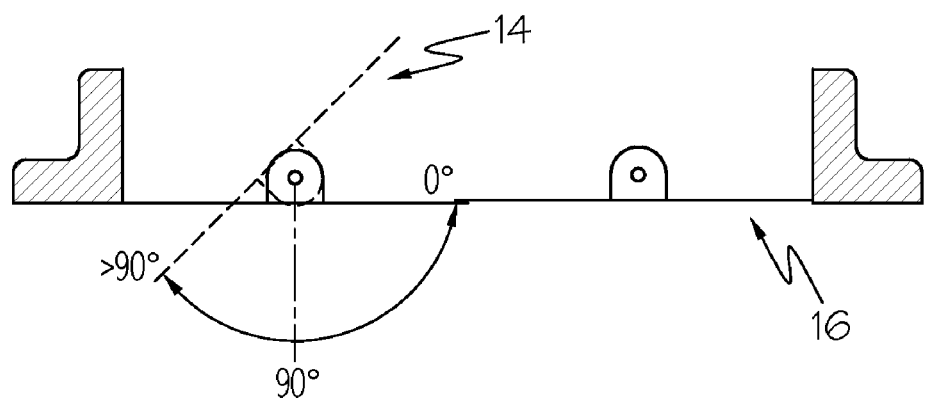
FIG. 3 is a schematic drawing showing rotation of the forward door of the thrust recovery valve of FIG. 1 beyond a 90 degree angle, according to an embodiment of the present invention.

FIG. 3 shows how the forward door 14 can be rotated independently to a greater than 90-degree angle while the aft door 16 can remain shut. This may allow a certain aerodynamic benefit of providing a ram air inlet with the forward door 14 while reducing the suction created (by the aft door 16 being open at the same time) by closing the aft door 16 independently of the forward door 14.

Likewise, implied by FIG. 3 is the ability of the aft door 16 to be rotated beyond its 90-degree open position independent of the forward door 14. This may also have a beneficial effect for ram air flow either by closing the forward door 14 and rotating the aft door 16 to beyond 90-degrees open, or by having both doors 14, 16 rotated beyond 90-degrees open at the same time.

Figure 4:
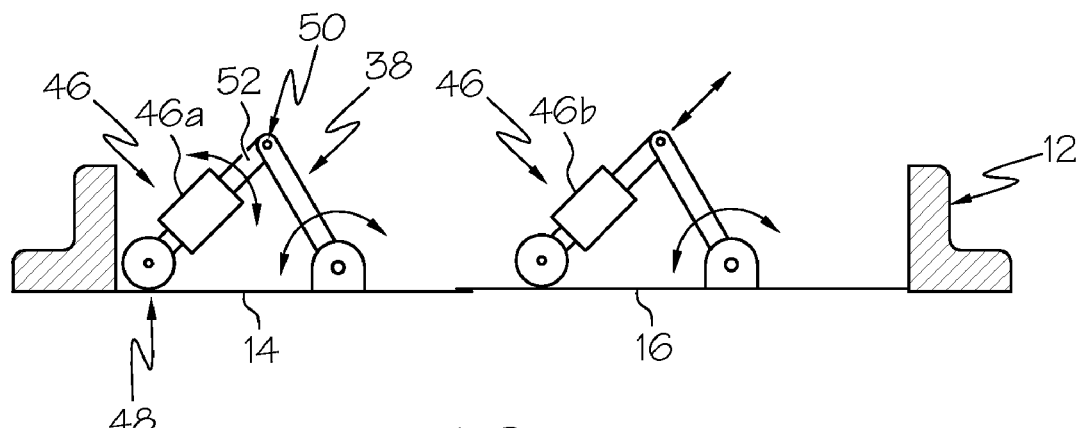
FIG. 4 is a schematic drawing showing the use of two linear actuators for operating a thrust recovery valve, according to an embodiment of the present invention.

FIG. 4 shows how two linear actuators 46, forward 46a and aft 46b, can drive each door 14, 16 independently. Using linear actuators 46 may allow less linkages to be utilized for each door movement. As shown, each linear actuator 46 may be linked to the valve frame 12 via a ball joint 48. The ball joint 48 may allow the linear actuator 46 to rotate, relative to the valve frame 12, while driving the door swing arm 38. The doors 14, 16 may be connected to the door swing arm 38 via a pin 50 so that an output shaft 52 of the linear actuator 46, as it extends and contracts, may pivot rotationally to the door swing arm 38.

Figure 5:
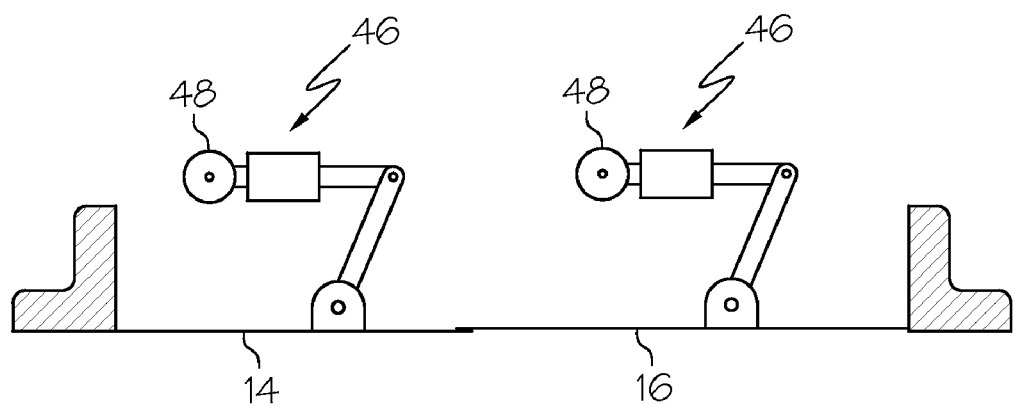
FIG. 5 is a schematic drawing showing the linear actuators of FIG. 4 mounted in a mechanically advantageous position, according to an embodiment of the present invention.

Location of each ball joint 48 may allow the linear actuator 46 to have more range of motion and/or more mechanical advantage. This is shown in FIG. 5.

Figure 6:
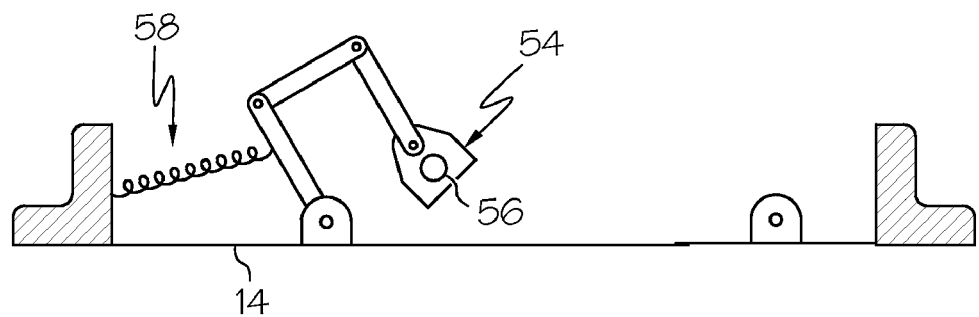
FIG. 6 is a schematic drawing showing the use of a single motor to control one door of a thrust recovery valve, according to an embodiment of the present invention.

FIG. 6 shows that one door of the valve, the forward door 14 in this figure, can be operated by a gearbox 54 containing a single motor 56. A single motor gearbox 54 may be lighter in weight and lower in cost and higher reliability as compared with gearboxes containing multiple motors.

The single motor gearbox 54 may be of a high efficiency spur and/or planetary design such that if the motor 56 is not controlled, the aerodynamic torque of the valve may close its door, overcoming the resistance to motion of the gearbox 54 because it is high efficiency.

If the aerodynamic torque is not enough to close the door, a spring 58 may be utilized to close the door. The spring 58 can be of a tension spring design (as shown), a power spring, or any other design that can overcome the resistance to closure of the gearbox 54 and/or aerodynamic torque.

Figure 7:
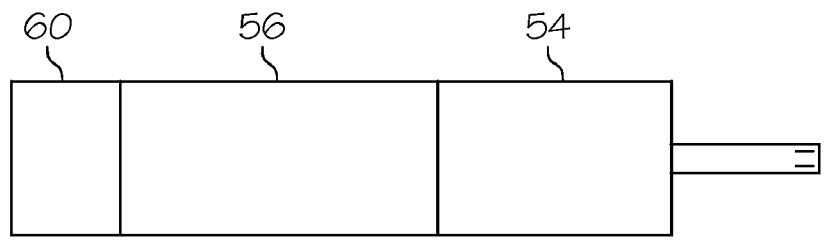
FIG. 7 is a schematic drawing showing the use of a brake with a single motor to control one door of a thrust recovery valve, according to an embodiment of the present invention.

For the single motor driven gearbox 54, a brake 60 can be employed for the purpose of holding the door (not shown) in its last position when power is removed from the motor 56. This is shown in FIG. 7. In this case, the brake 60 may be engaged (braked) when power is removed, locking the motor 56 and gearbox 54 to its last position. Likewise, the brake 60 can be used to lock the gear train (not shown) directly, not using the motor 56.

Likewise, with FIGS. 6 and 7, the forward door 14 can be rigged with this same actuator/motor/brake/spring arrangement, or any other type of gearbox/actuator arrangement with any other type or quantity of motors.

Figure 8:
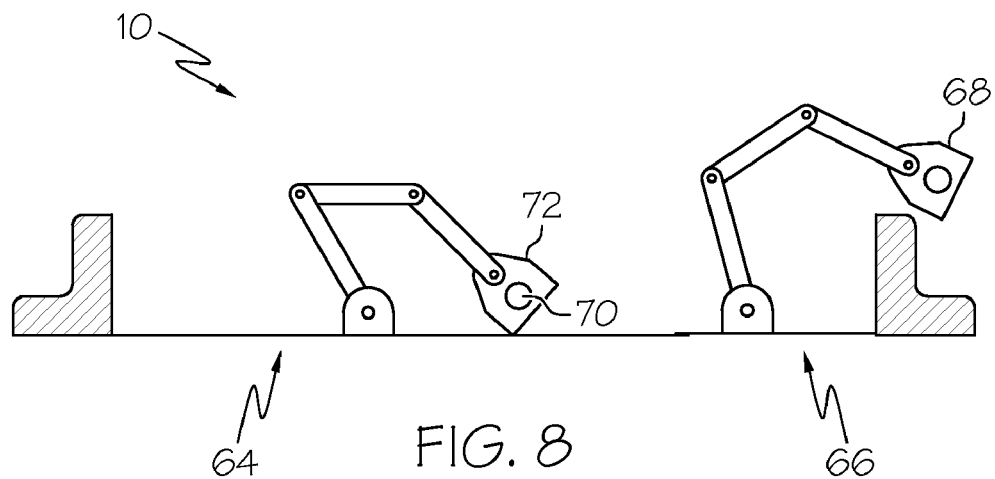
FIG. 8 is a schematic drawing showing two differently sized, independently driven thrust recovery valve doors, according to an embodiment of the present invention.

Referring now to FIG. 8, there is shown a valve arrangement having two differently sized independently driven doors 64, 66. In this depiction, the forward door 64 may be larger than the aft door 66, allowing the aft door 66 to be driven by its gearbox/actuator 68 for fine control of the valve 10, while the forward door 64 of the valve 10 may be driven by an independent gearbox/actuator 72 for course adjustments or to allow larger quantities of air to exhaust.

Likewise, the forward door 64 may be opened on the ground only, or for emergency conditions in flight (positive differential pressure relief or negative pressure relief "ram" air position), while the aft door 66 may be independently positioned in flight (opened or closed) and opened also on the ground.

There could be a configuration whereby the forward door 64 is driven by a single motor 70, high efficiency gearbox 72, and brake arrangement (see FIGS. 6 and 7), while the aft door 66 may be driven by a different gearbox 68 with more redundancy.

Figure 9:
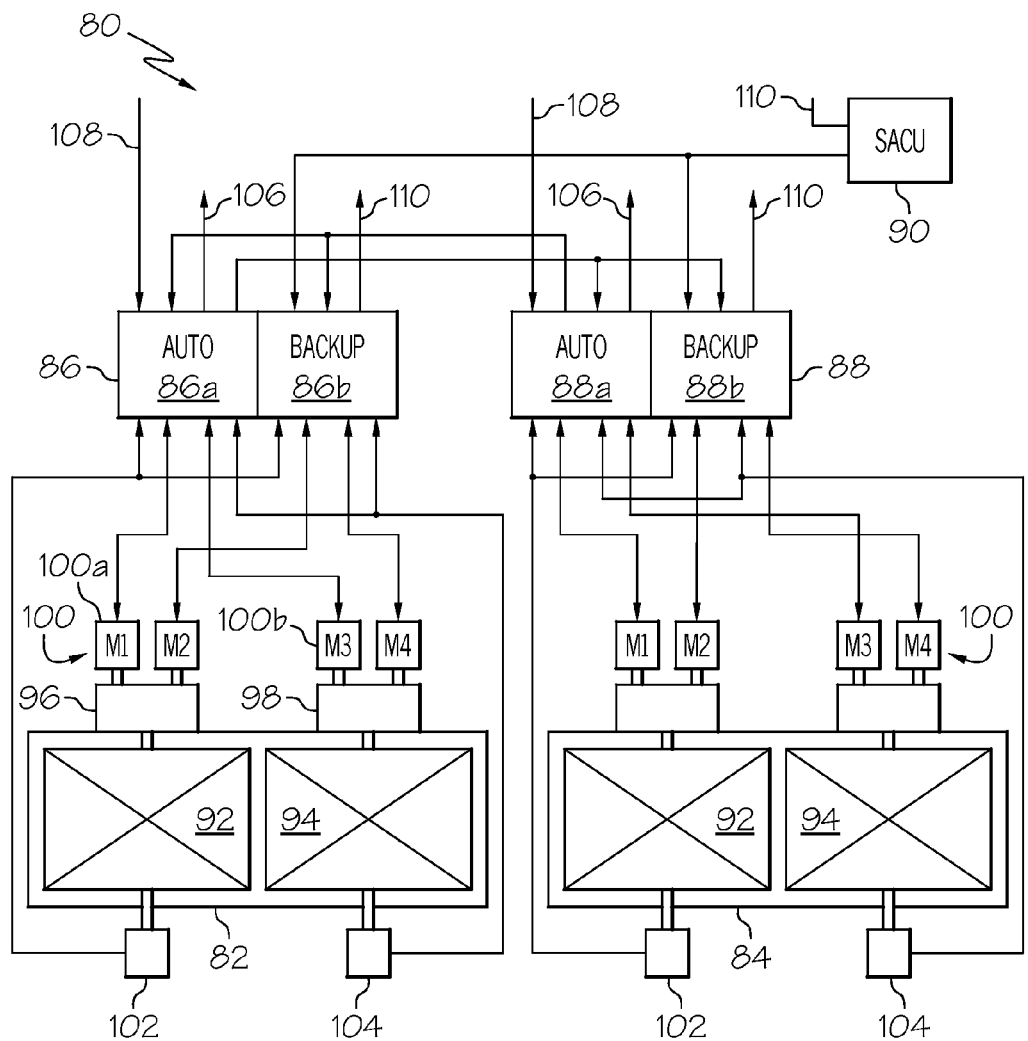
FIG. 9 is a schematic drawing of a cabin pressure control system according to an embodiment of the present invention.

FIG. 9 shows a cabin pressure control system 80 (not including any independent negative or positive differential pressure relief valves/controls) whereby there are two thrust recovery outflow valves 82, 84 (TROVs), two outflow valve controllers 86, 88 (OCUs), and a semi-automatic control unit 90 (SACU).

As shown in FIG. 9, each TROV 82, 84 may consist of forward door 92 and an aft door 94, independently controlled by a forward gear box 96 and aft gear box 98 and motors 100. On each TROV door hinge (not shown) may be a rotary valve position sensor 102, 104, each with two outputs for a total of four position outputs.

As shown in FIG. 9, there may be two OCUs 86, 88, each containing an auto control channel 86a, 88a and a backup control channel 86b, 88b. Each of the channels (auto 86a, 88a and backup 86b, 88b) can drive two motors 100 on the TROV 82, 84. Each channel 86a, 88a, 86b, 88b may drive a motor on the forward gearbox 100a and a motor on the aft gearbox 100b, giving each channel total control of the entire TROV 82, 84. Each channel of the OCU 86, 88 may receive valve position feedback from both rotary position sensors 102, 104.

Each OCU's auto channel 86a may communicate with the other OCU's auto channel 88a to coordinate TROV 82, 84 positioning and the resulting cabin pressure as a function of cabin pressure control laws.

In the event of a failure of one or the other OCU's 86, 88 auto control, the remaining healthy OCU can communicate with the other OCU's backup control channel to allow the system to remain in automatic cabin pressure control.

In the event that both OCUs' 86, 88 auto channels fail, the SACU 90 can command TROV 82, 84 position via the OCUs' backup channels 86b, 88b.

The OCUs 86, 88 and SACU 90 may have power inputs 106 and avionics interfaces 108 as shown in FIG. 9, whereby the OCUs' auto channels 86a, 88a may have separated input powers, and the backup channels 86b, 88b and SACU 90 may share the same emergency power bus 110.

One example of the OCU/SACU architecture that may be useful in the present invention may be found in U.S. Patent Publication Number 2008/0233854, herein incorporated by reference.

According to one embodiment of the present invention, one controller channel can control an entire TROV (forward and aft doors). And, any control architecture that has two motor controllers per channel so as to control both TROV doors, can be considered possible, including a separation of controller functions whereby a cabin pressure controller communicates a signal to a motor controller in any manner.

Figure 10:
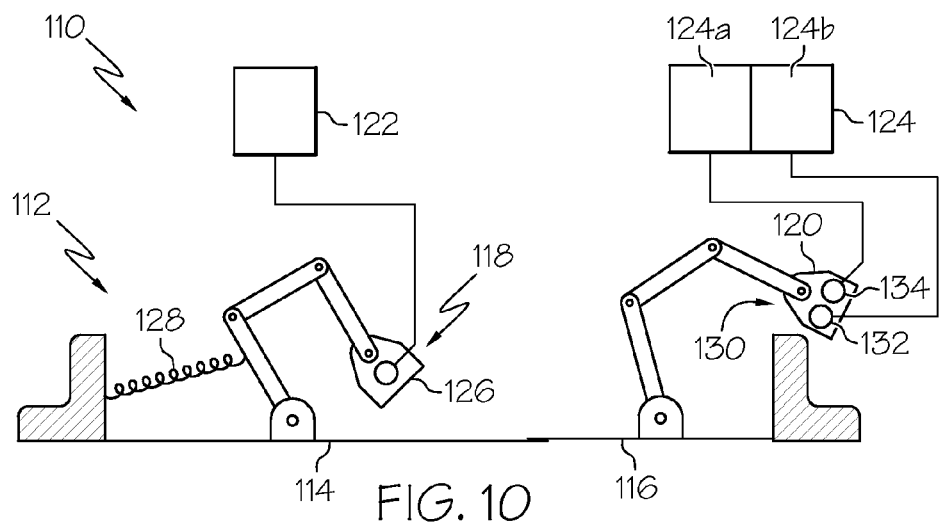
FIG. 10 is a schematic drawing of another cabin pressure control system according to an embodiment of the present invention.

Another valve and controls configuration 110 is given in FIG. 10. In FIG. 10, a valve 112 is shown that has two independently actuated doors 114, 116 and two independent gearboxes 118, 120, controlled by two independent controllers 122, 124. The larger forward door 114 may be controlled by the forward door controller 122. A forward door actuator 126 may be a high efficiency gearbox with a motor and brake (see FIGS. 6, 7 and 8). There may be a tension spring 128 to pull the forward door 114 closed in the event of a failure of the controller 122 due to loss of power or loss of a mechanical linkage connection. This may be important to prevent the door 114 from being opened during flight without being commanded by the forward door controller 122.

The smaller aft door 116 may be controlled by the aft door controller 124. The aft door controller 124 may be of a dual channel design for control redundancy. Likewise, a gearbox 130 may have two motors 132, 134 to be controlled by each channel 124a, 124b of the dual aft door controller 124 (see FIG. 1). The added redundancy may be important due to the criticality of the aft door 116 opening function in flight.

The forward door controller 122 may be completely independent of the aft door controller 124. The forward door controller 122 may control the forward door 114 open on the ground and closed it in flight. In the event that there is an excess differential pressure build up in flight, the forward door controller 122 may modulate the forward door 114 to exhaust air out of the fuselage and regulate the cabin to ambient differential pressure. Therefore, the forward door controller 122 may have control integrity to prevent the forward door from being opened erroneously during flight.

According to embodiment of the present invention, there may be two independent doors operated independently of each other by different control systems using the same valve. It can be envisioned that there are more than one type of controller and control schemes to operate a single valve via independently actuated doors.

It should be understood, of course, that the foregoing relates to exemplary embodiments of the invention and that modifications may be made without departing from the spirit and scope of the invention as set forth in the following claims.

I claim:

1. A thrust recovery valve comprising:
   a first door;
   a second door;
   a first rotary actuator controlling travel of the first door;
   a second rotary actuator controlling travel of the second door independent of the travel of the first door;
   a first crank arm fixed at a first end to a first output shaft of the first rotary actuator wherein, when the first output shaft rotates, the first crank arm swings in a rotational arc;
   a first link pivotally pinned at a first end to a second end of the first crank arm;
   a first door swing arm pivotally pinned at a first end to a second end of the first link and fixed at a second end to the first door, wherein the first door rotates on a first hinge when the first output shaft rotates;
   a second crank arm fixed at a first end to a second output shaft of the second rotary actuator wherein, when the second output shaft rotates, the second crank arm swings in a rotational arc;
   a second link pivotally pinned at a first end to a second end of the second crank arm; and
   a second door swing arm pivotally pinned at a first end to a second end of the second link and fixed at a second end to the second door, wherein second the door rotates on a second hinge when the second output shaft rotates.

2. The thrust recovery valve according to claim 1, wherein the first and second rotary actuators comprise a first gear box and a second gear box.

3. The thrust recovery valve according to claim 2, wherein the first gear box is driven by a first primary motor and a first backup motor and the second gear box is driven by a second primary motor and a second backup motor.

4. The thrust recovery valve according to claim 1, further comprising a first position sensor on the first door and a second position sensor on the second door.

5. The thrust recovery valve according to claim 1, wherein the first door and the second door are mounted in a single frame.

6. The thrust recovery valve according to claim 1, wherein at least one of the first door and the second door opens at an angle greater than 90 degrees relative to a closed position.

7. The thrust recovery valve according to claim 1, wherein a portion of the first door overlaps with a portion of the second door.

* * * * *